United States Patent
Wu

(10) Patent No.: US 10,683,838 B2
(45) Date of Patent: Jun. 16, 2020

(54) WAVE POWERED ELECTRICITY GENERATOR

(71) Applicant: Dien-Foon Wu, Taipei (TW)

(72) Inventor: Dien-Foon Wu, Taipei (TW)

( * ) Notice: Subject to any disclaimer, the term of this patent is extended or adjusted under 35 U.S.C. 154(b) by 139 days.

(21) Appl. No.: 15/922,071

(22) Filed: Mar. 15, 2018

(65) Prior Publication Data
US 2019/0285045 A1  Sep. 19, 2019

(51) Int. Cl.
| F03B 13/20 | (2006.01) |
| F16H 19/04 | (2006.01) |
| F16H 7/02 | (2006.01) |
| F16H 31/00 | (2006.01) |

(52) U.S. Cl.
CPC .............. F03B 13/20 (2013.01); F16H 7/023 (2013.01); F16H 19/04 (2013.01); F16H 31/001 (2013.01); F05B 2240/93 (2013.01); F05B 2260/4031 (2013.01); Y02E 10/38 (2013.01)

(58) Field of Classification Search
CPC ...... F03B 13/20; F03B 13/186; F16H 31/001; F16H 7/023; F16H 19/04; F16H 7/02; F05B 2240/93; F05B 2260/4031; F05B 2240/40; F05B 2260/505; F05B 2260/4021
See application file for complete search history.

(56) References Cited

U.S. PATENT DOCUMENTS

| 2,749,085 | A | * | 6/1956 | Searcy | F03B 13/186 60/505 |
| 4,145,885 | A | * | 3/1979 | Solell | F03B 13/1855 290/53 |
| 4,718,231 | A | * | 1/1988 | Vides | F03B 13/1815 60/398 |
| 6,711,897 | B2 | * | 3/2004 | Lee | F03B 13/1815 60/496 |
| 7,768,143 | B2 | * | 8/2010 | McCague | F03B 13/186 290/42 |
| 7,841,830 | B1 | * | 11/2010 | Gasendo | F03B 17/066 415/124.1 |
| 9,790,914 | B2 | * | 10/2017 | Lee | F03B 13/1855 |
| 10,077,756 | B2 | * | 9/2018 | Trevarthen | F03B 13/10 |
| 10,227,961 | B2 | * | 3/2019 | Dragic | F03B 13/1855 |

(Continued)

FOREIGN PATENT DOCUMENTS

CN  103266980 A  8/2013

*Primary Examiner* — Michael C Zarroli
(74) *Attorney, Agent, or Firm* — Muncy, Geissler, Olds & Lowe, P.C.

(57) ABSTRACT

A wave powered electricity generator is provided. Waves are separated from a floating platform unit by using a partition plate unit so that the floating platform unit enclosed by the partition plate unit is almost no wave. The waves outside the partition plate unit are to move many floating ball units up and down so that the racks provided on each of the floating ball units are capable of rotating the gears extending from the floating platform unit, and the rotational forces of gears are regulated through ratchets and consolidated to produce a power for driving generators. The racks on the floating ball units and the gears on the floating platform unit are pulled together by using springs. The resilient force of the two springs simultaneously helps the rack's 'up and down' in smooth reciprocating motion. Then the gears directly and indirectly output a force to drive generators.

8 Claims, 21 Drawing Sheets

(56) References Cited

U.S. PATENT DOCUMENTS

| | | | | |
|---|---|---|---|---|
| 2009/0230684 A1* | 9/2009 | Gasendo | ............... | F03B 13/186 290/53 |
| 2012/0007363 A1* | 1/2012 | Wang | .................. | F03B 13/1815 290/53 |
| 2014/0360176 A1* | 12/2014 | Wu | ..................... | F03B 13/1815 60/505 |

* cited by examiner

WAVE POWERED ELECTRICITY GENERATOR

FIELD OF THE INVENTION

The present invention is related to a mechanism for generating electricity by using wave's undulation power, especially it applies the wave-separation method to isolate a waveless section from waves' intrusion in order to enhance efficiency and reduce construction cost.

BACKGROUND

Nowadays, to develop renewable energy become a trend and an important policy for all countries around the world and surely it will be more and more emphasized as time goes by because today's air-polluting energy resources will predictably run out in 140 years. In contrast, out of the sea area, 71% of total globe area, 2-3 billion KW, the applicable sea-wave energy, is wasted every day. In the world, there are thousands of facilities using wave's undulation power to generate electricity. Nevertheless, in spite of the tremendous human and material resources invested by many countries to develop this sea-wave energy, none of them is truly efficient and economical.

DESCRIPTION OF RELATED TECHNIQUES

Oscillating Buoy: As wave power moves oscillating buoy up and down, it drives a hydraulic pump to move reciprocally. Then using energy conservative and voltage stabilizing system to transfer the unstable hydraulic pressure into stable hydraulic pressure to drive hydraulic motor through which the electricity generator is driven. Drawback: a. It has to be fixed at the seafloor b. it is easily turned over by a typhoon.

Suspension pendulum: A huge suspension pendulum swings as the waves moves it. This pendula motion moves the piston and then to drive hydraulic motor through which the electricity generator is driven. Drawbacks: A) The huge pendulum's pivot has to be fixed at a concreted structure, a huge construction B) low efficiency. C) No possibility of expansion.

Floating pendulum: In comparing with suspension pendulum style, the hinge of a huge pendulum is fixed at the seafloor—also tremendous engineering work.

Raft: Many long raft bodies are hinged together to make a snake-shaped mechanism. It is composed with hinge chain, raft body, and hydraulic pressure system. As raft body is moved by waves, it transfers wave energy into mechanical energy. The method has an advantage of better wind-resistance and consistency of electricity generating. But its alignment has to be adjusted according to the wave direction. Low efficiency, high cost.

Other mechanical methods: Waves move the mechanism's active part such as head-nodding duck, mussel, floating object, point absorbing etc. These active parts move medium material such as water, oil etc. to drive the electricity generating facilities. Low efficiency, low output, cannot provide electricity for commercial use.

Generally speaking, all the listed above and other methods such as Oscillating Water Column (OWC), Over Topping, Magnetic Fluid etc. are low efficiency, huge engineering, high cost, lack of construction flexibility, difficult to maintain, and low utilization rate on available sea area.

SUMMARY OF THE INVENTION

Basically this invention comprises many pontoon units, one floating platform unit, and one partition plate unit.

The main purpose of this invention is to provide a wave powered electricity generator in its high efficiency, easy construction, low cost, and high flexibility in order to bring a great amount of convenient, clean, and cheap electricity to all humanity.

This invention is a method in which a floating platform unit is isolated from large waves by using a partition plate unit so that the floating platform unit enclosed by the partition plate unit is in a state of almost no wave. These large waves outside the partition plate unit are to move many floating ball units up and down so that the gear racks provided on each of the floating ball units are capable of rotating the power gears which is extended from the floating platform unit, and the rotational forces of power gears are regulated through ratchet gears and consolidated to produce a single direction rotating power, then to drive external generators. The gear racks on the floating ball units and the power gears on the floating platform unit are pulled together by using springs. These spring force of the two springs simultaneously helps the gear rack's 'up and down' reciprocating motion. Then the power gears, directly and indirectly, drive the multiple coaxial driven gears to output a single direction of rotation, and then to drive the external generators. The invention has the advantages of super high-efficiency, simple structure, easy to set up, can be fixed or not fixed on the shore, and can be set up offshore; The size of the unit can be easily extended or adjusted linearly in terms of power demand. It can fully utilize the available sea area.

SYMBOL DESCRIPTION

| | | | |
|---|---|---|---|
| 10 | pontoon unit | 110 | pontoon |
| 120 | arched plate | 130 | flame |
| 131 | gear rack | 132 | spring |
| 133 | buckle | 134 | supporting rod |
| 135 | link slide block | 136 | barrier strip |
| 137 | hole | 20 | floating platform unit |
| 210 | floating platform | 220 | supporting frame |
| 221 | central rotation shaft | 222 | sideways rotation shaft |
| 223 | dynamic gear | 224 | ratchet gear |
| 225 | passive gear | 226 | cog belt or chain |
| 227 | buckle plate | 228 | sliding rail |
| 229 | connection bar | 22a | direction-reverse gear |
| 22b | direction-reverse shaft | 30 | partition plate unit |
| 310 | rope | 320 | heavy chunk |
| 330 | open channel | 350 | iron ball |
| 360 | floating box | 223(a) | shaft sleeve |
| 132(a) | spiral spring | 370 | electric generator set |
| 371 | power cable | 138 | rail |
| 139 | bearing pulley | | |

DESCRIPTION OF THE PREFERRED EMBODIMENT

Figure 1:
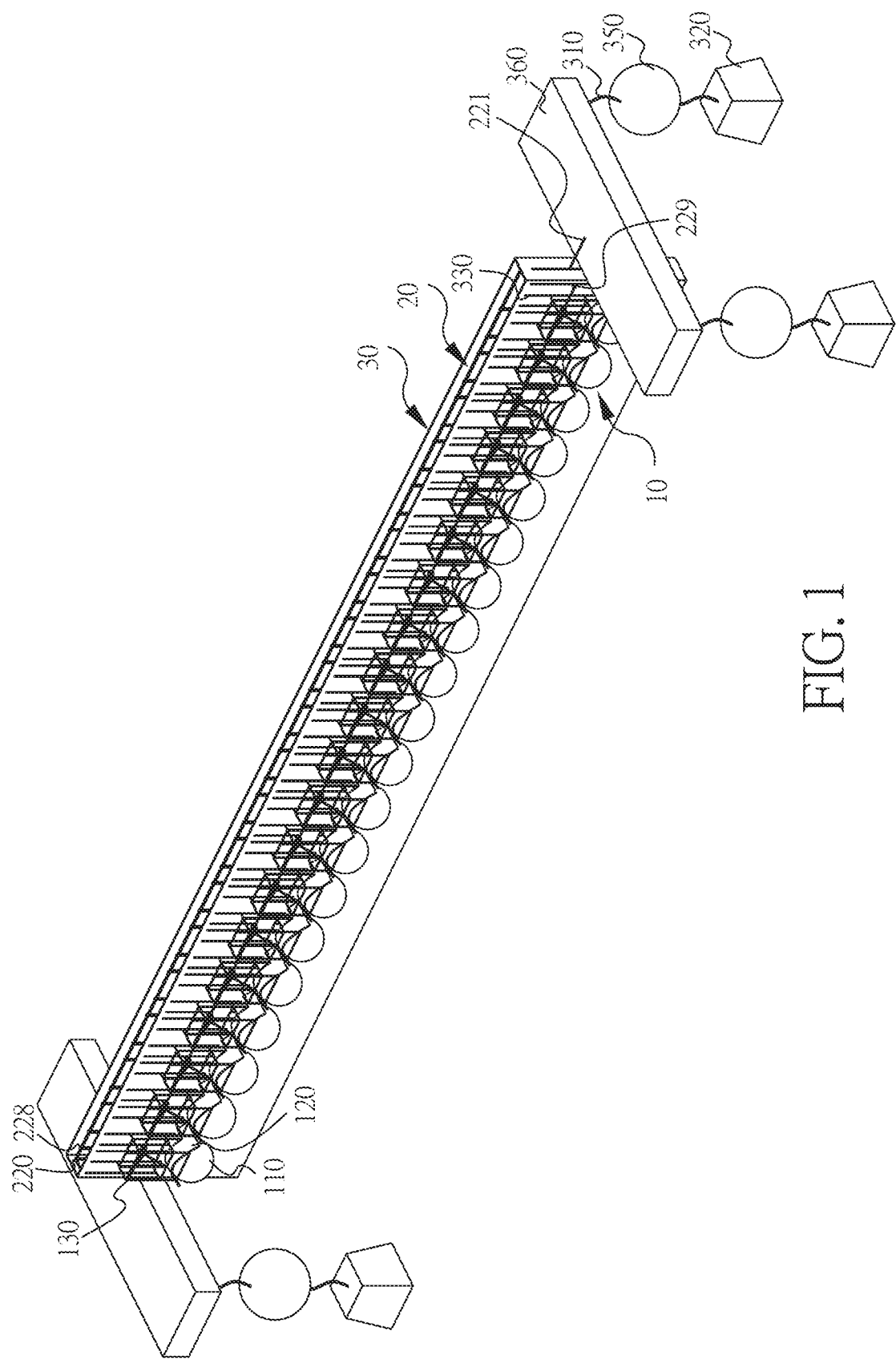
FIG. 1 is a schematic 3-D overall structure view of a present invention's embodiment.
Figure 2:
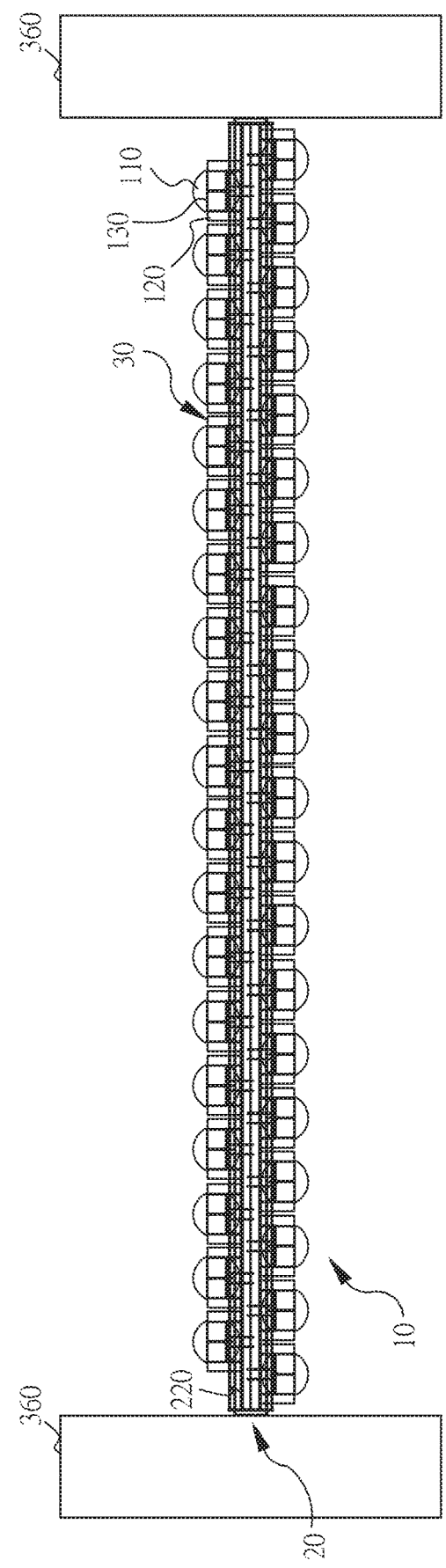
FIG. 2 is a schematic top view of a present invention's embodiment.
Figure 3:
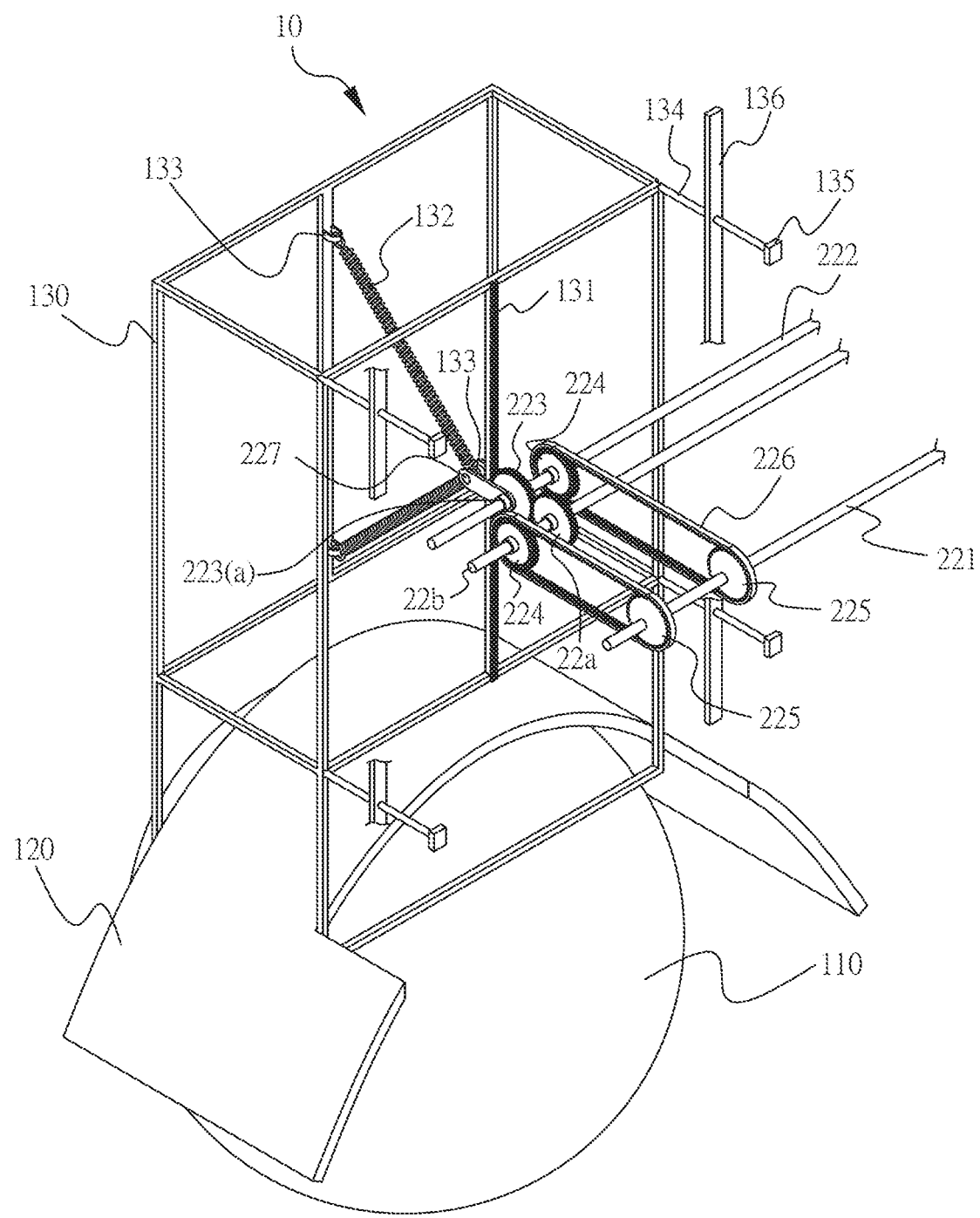
FIG. 3 is a schematic 3-D pontoon unit view of a present invention's embodiment.
Figure 12:
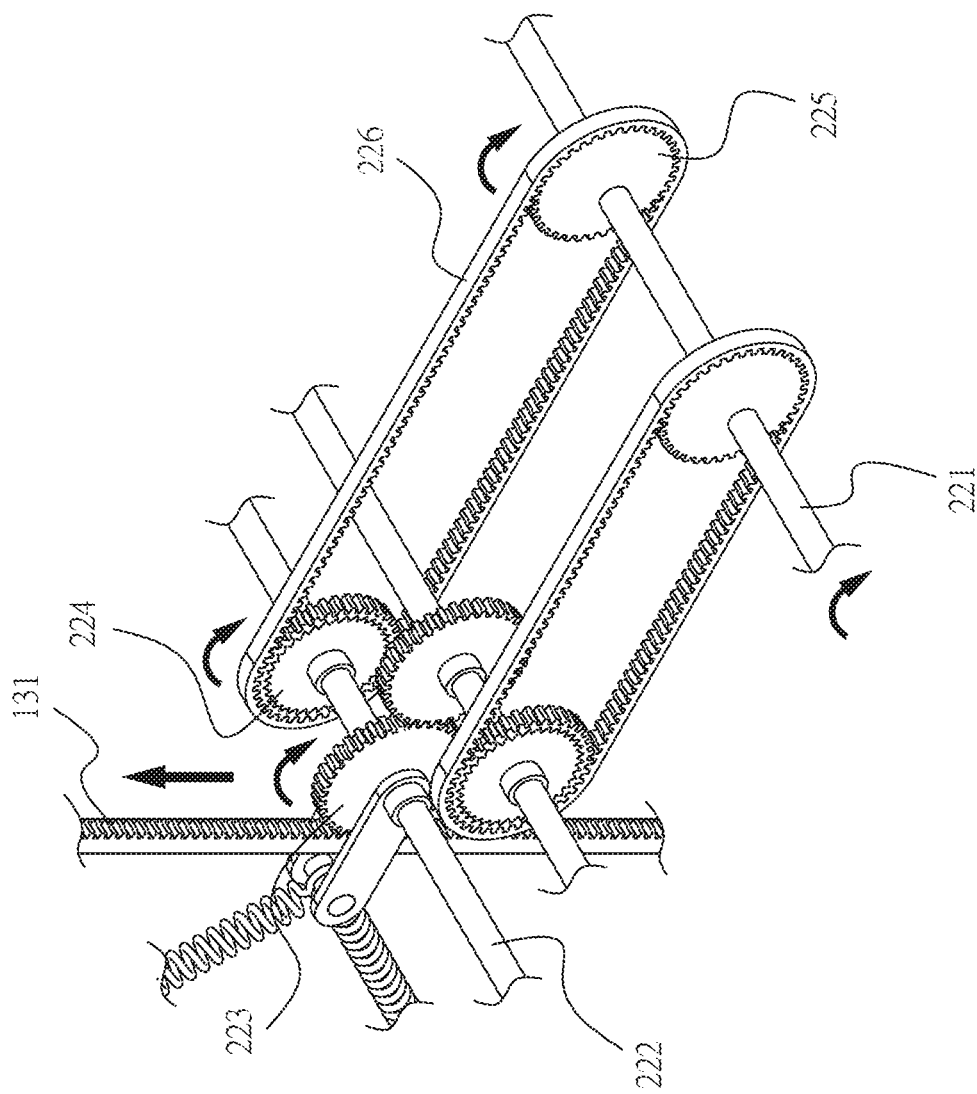
FIG. 12 illustrates that when gear rack rises, it drives dynamic gear, right-hand side ratchet gear, cingulum, passive gear, and central rotation shaft.
Figure 12A:
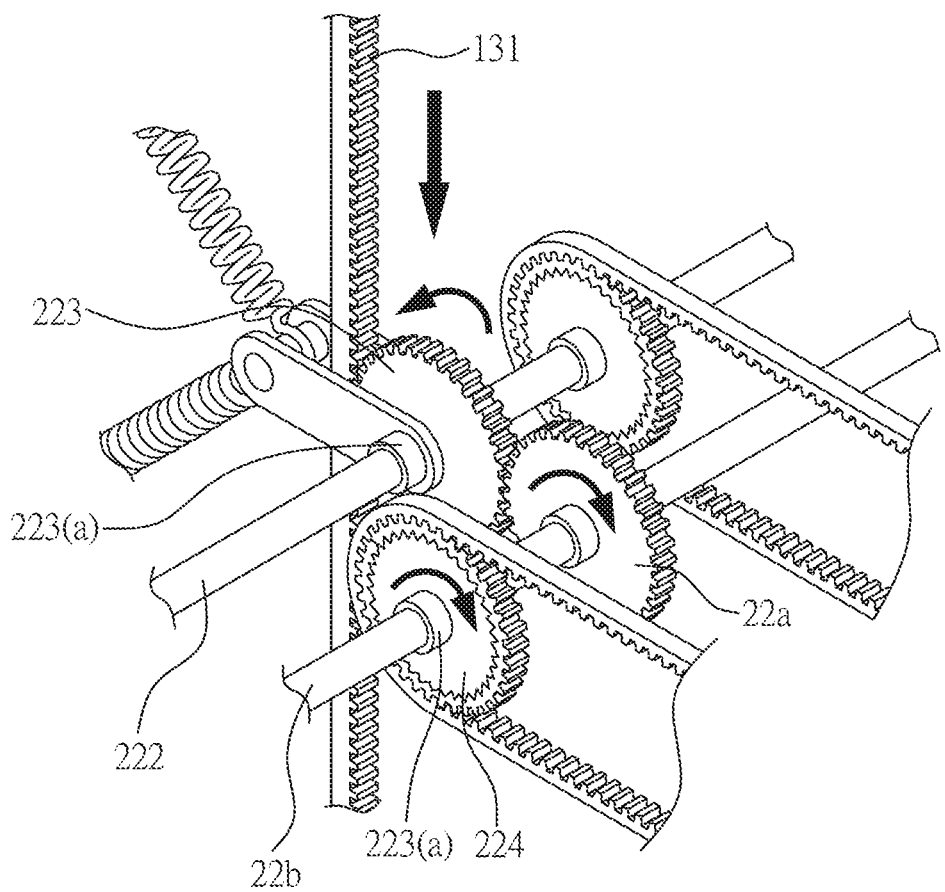
FIG. 12A is a schematic 3-D view of dynamic gear, ratchet gears, reversal gear, and shaft sleeve.

This invention is a wave powered electricity generator. Basically, it comprises many pontoon units (10), one floating platform unit (20), and one partition plate unit (30). Referring to FIG. 1 through FIG. 16B, one of the embodiment examples is listed below:

Referring to FIG. 1-5, the floating platform unit (20) comprises a long and large floating platform (210) above which a supporting frame (220) is set up. This floating platform (210) is to lift up the supporting frame (220) above sea level. A central rotation shaft (221) is set up above the supporting frame (220). At each side of the central rotation shaft (221), a sideways rotation shaft (222) is set up. On each of the sideways rotation shaft (222), many dynamic gears (223) ("dynamic gear" may be defined as first gear) are set up. Each of the dynamic gear (223) is corresponding to one pontoon unit (10). Referring to FIG. 3, on dynamic gear's (223) right-hand side (as defined in FIG. 3.) is a ratchet gear (224) is set up. Corresponding to this ratchet gear's (224) a passive gear (passive gear may be defined as second gear) (225) is set up on central rotation shaft (221). This ratchet gear (224) and the corresponding passive gear (225) are connected with cog belt or chain (226). This dynamic gear (223) also meshes a direction-reverse gear which is set up on the direction-reverse rotation shaft which is set up on the supporting frame (220). At a side of the direction-reverse gear, a ratchet gear (224) is also set up. This ratchet gear (224) also connects to a passive gear (225) on the central rotation shaft (221) with cog belt or chain (226). At both ends of the central rotation shaft (221), two electric generators (370) are connected. Thereby, passive gears' (225) revolution drives central rotation shaft (221) and then to drive electric generators (370) to generate electricity. Besides, as shown in FIG. 12A, the sideways rotation shaft (222) has to be equipped with shaft sleeves (223(a)) in order to fit in with dynamic gear's (223) motion.

Referring to FIG. 3 again, the previously stated right-hand side (as defined in FIG. 3) ratchet gear (224) can rotate when pontoon rises and keep motionless when pontoon sinks. In order to generate electricity when pontoon either rises or sinks, this dynamic gear (223) also meshes a direction-reverse gear (22a) which is set up on direction-reverse axis (22b) erected on supporting frame (220). At the left-hand side, (as defined in FIG. 3) of this direction-reverse gear (22a) also set up a ratchet gear (224) on direction-reverse axis (22b). Corresponding to this ratchet gear (224) a passive gear (225) on central rotation shaft (221) is set up. This ratchet gear (224) also connects the corresponding passive gear with cog belt or chain (226). This ratchet gear (224) rotates as pontoon (110) sink and keep motionless as pontoon rise.

Figure 4:
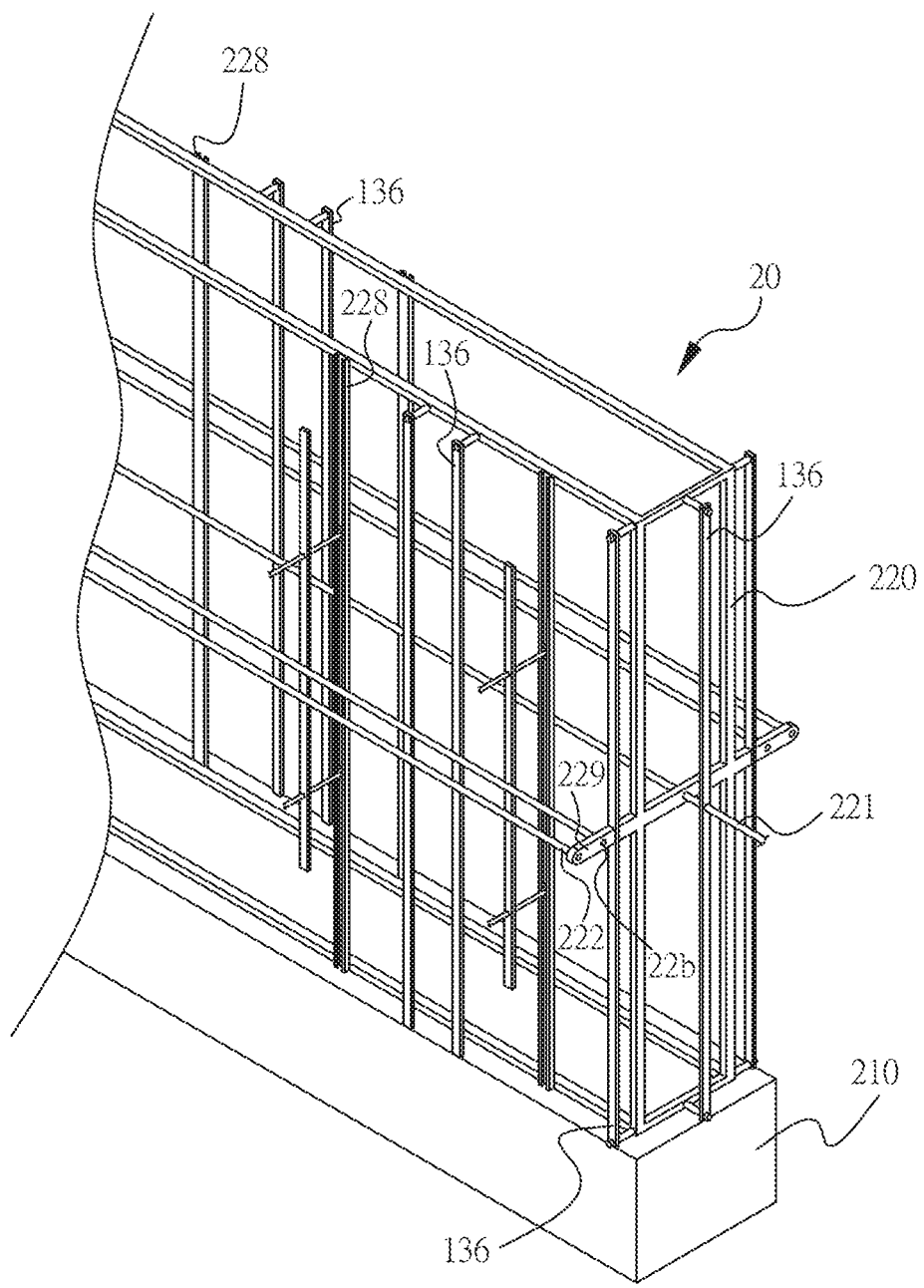
FIG. 4 is a partial schematic 3-D floating platform unit view in an embodiment example.
Figure 4A:
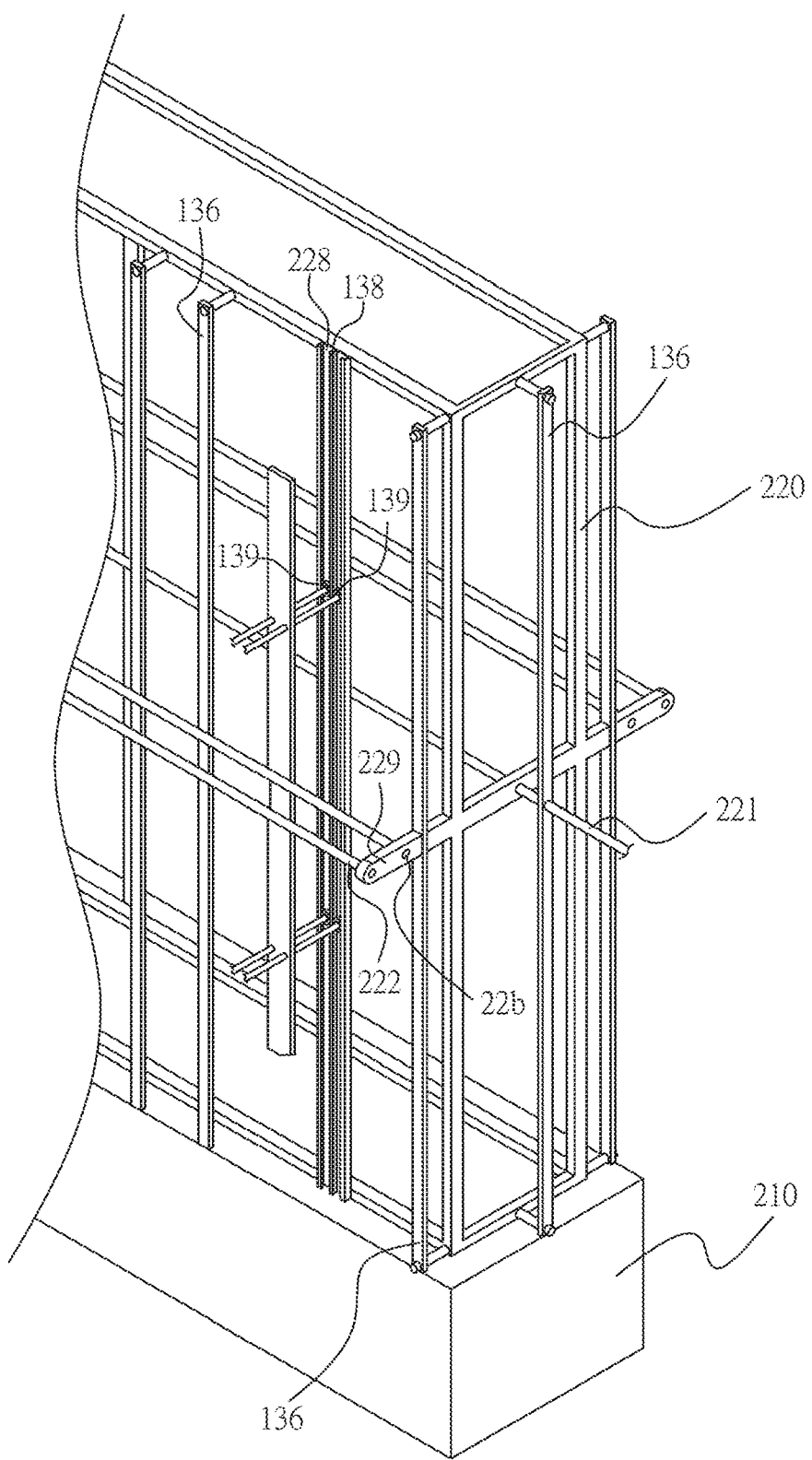
FIG. 4A is a partial schematic 3-D floating platform unit view with bearing and rails in an embodiment example.
Figure 5:
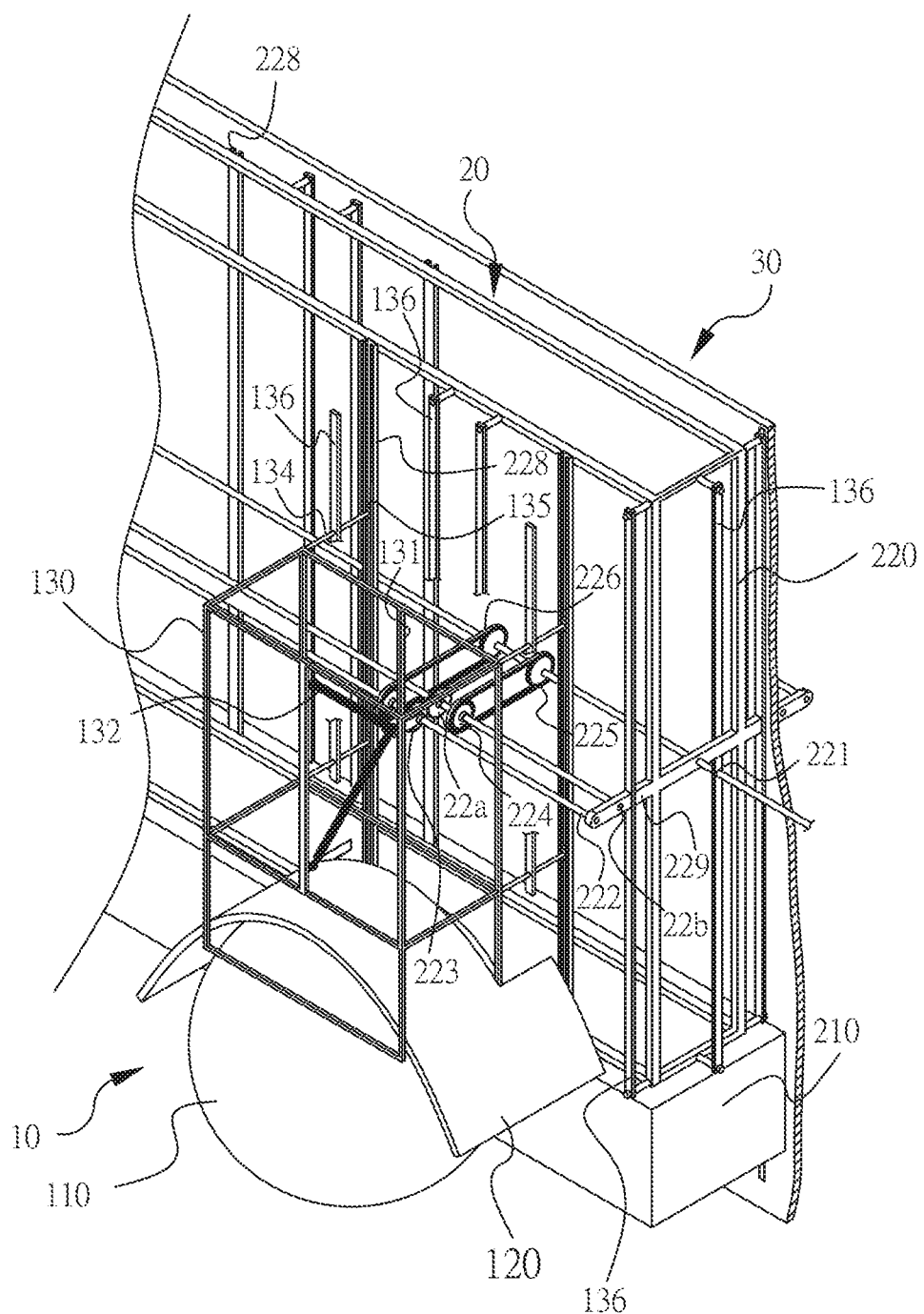
FIG. 5 is a partial schematic 3-D view of combination of floating platform unit and pontoon unit in an embodiment example.
Figure 6:
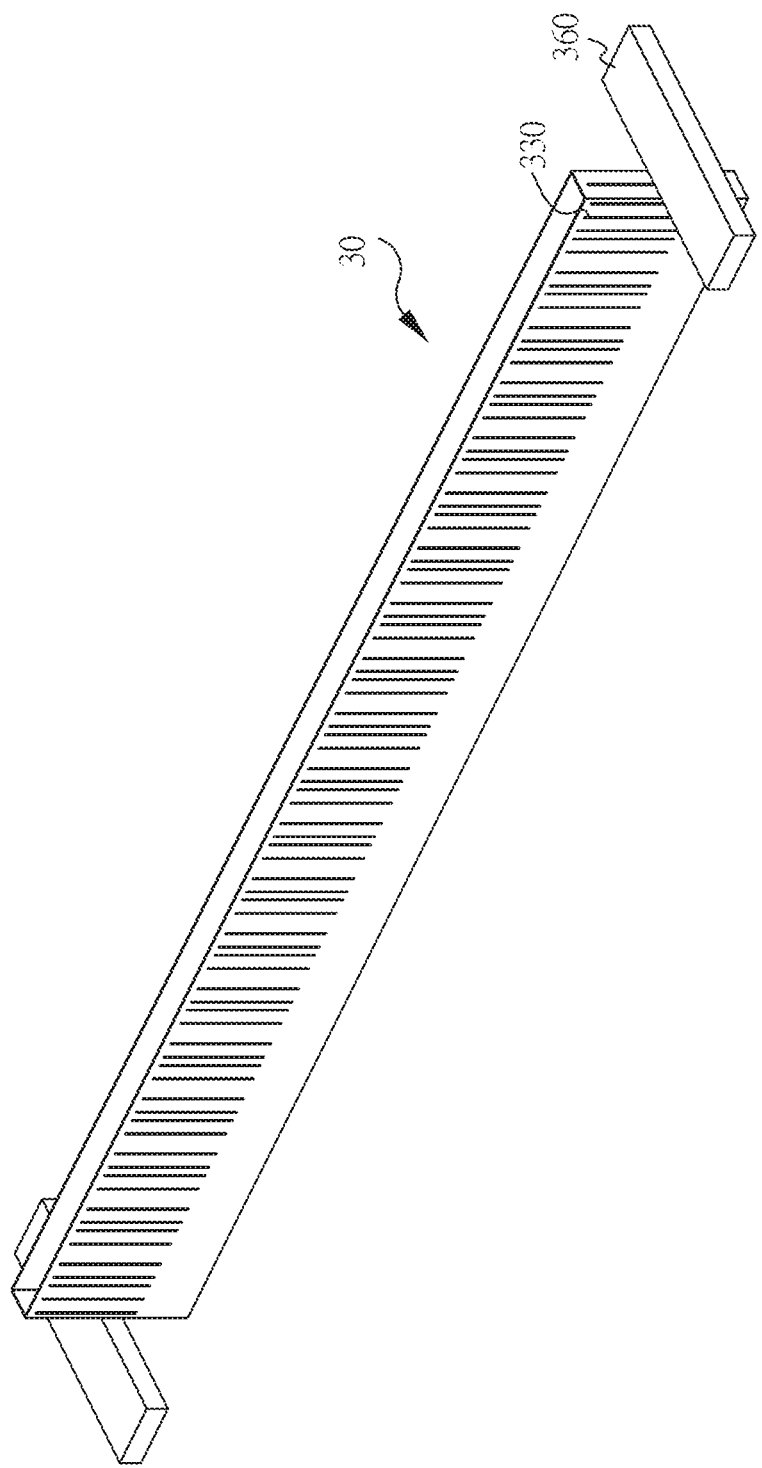
FIG. 6 is a schematic 3-D partition plate unit view in an embodiment example
Figure 13:
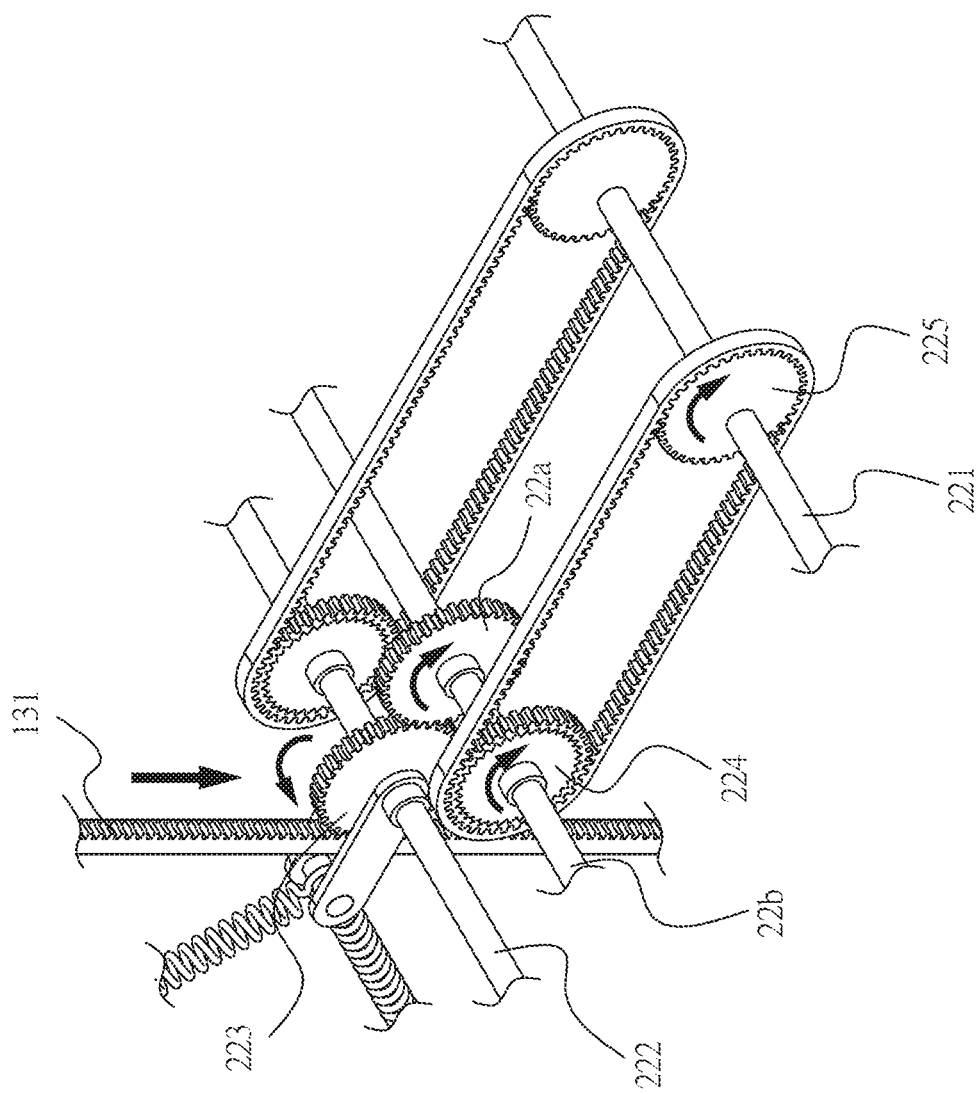
FIG. 13 illustrates that when gear rack sinks, it drives dynamic gear, left-hand side ratchet gear, cingulum, passive gear, and central rotation shaft.

As shown in FIG. 2, the pontoon unit (10) is set up at one side of the floating platform unit (20). This pontoon unit (10) and the floating platform unit (20) are separated by the partition plate unit (30). As shown in FIG. 3-5, the pontoon unit (10) includes a pontoon (10) above which is covered with an arched plate (120). Above this arched plate (120), a frame (130) is set up. At this frame's (130) side which is facing floating platform unit (20), a vertical gear rack (131) is set up. This gear rack (131) meshes the dynamic gear (223). As shown in FIG. 12 and FIG. 13, when waves move pontoon (110) up and down, the gear rack (131) goes up and down. Along with gear rack's (131) going up and down, the dynamic gear (223) spin either clockwise or counterclockwise. This dynamic gear (223) directly or indirectly turn two sides' ratchet gear (224) at two reversed directions. Through passive gears, these two directional spinning forces are then consolidated into a single direction to drive the central rotation shaft (221) then drive the electric generator (370); therefore, as waves go either up or down, power produced. Besides, the arched plate (120) is to absorb more wave's thrust power to enhance the energy absorbing efficiency. In an embodiment example, the sideways rotation shaft (222) and direction-reverse shaft (22b) are fastened without spinning motion.

Figure 14:
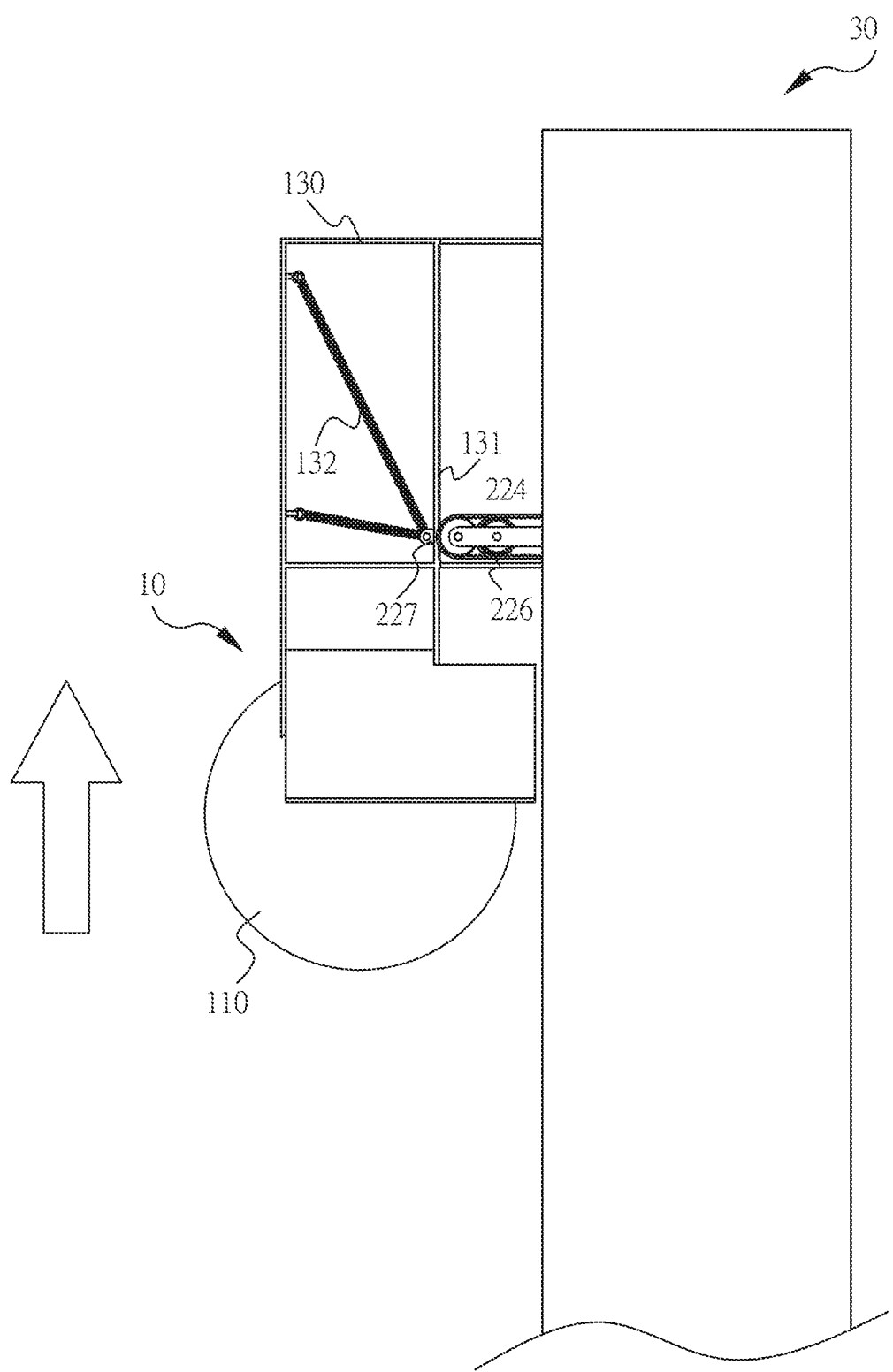
FIG. 14 illustrates how the spring functions when pontoon unit rises relatively to partition plate unit.
Figure 15:
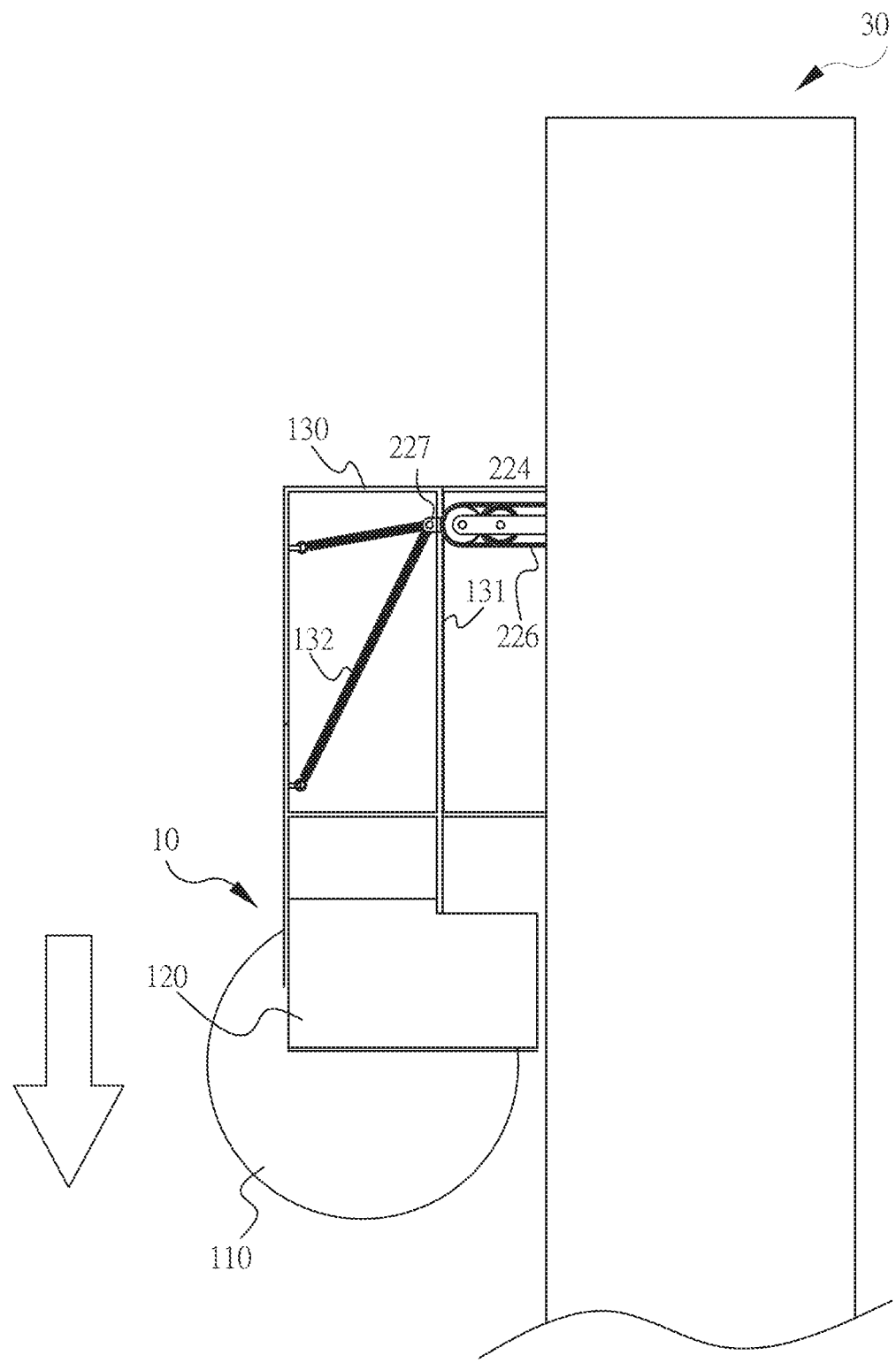
FIG. 15 illustrates how the spring functions when pontoon unit sinks relatively to partition plate unit.

As shown in FIGS. 3, 10, 11, and 11A, beside dynamic gear (223), two buckle plates (227) stretch out. These two buckle plates connect two springs which pull the dynamic gear (223) toward the frame in order to mesh the gear rack (131), also when the frame rises or sinks (as shown in FIGS. 14 and 15), one of the two springs can store the mechanic energy so that when the frame goes back in the opposite direction the stored energy can be released. Hence these two springs make the gear rack (131) move smoothly. Because this mechanism absorb sea wave energy when gear rack (131) goes either up or down, therefore it works in better efficiency and smoothness than those designs which work only when waves go up or down. In an embodiment example, at the ends closer to dynamic gear, these two springs (132) may use buckles (133) to connect buckle plates (227) for easy installation and replacement. Besides, this invention's spring (132) design also brings some special effect as following:

When this wave powered electricity generator is installed in sea area or beside seashore, the height of frame (130) can be made equal to or larger than the maximum wave height (from crest to trough) of the waves around that area. However, in case of big waves caused by gale, on the way of the waves' going up, the frame is brought up so high that the frame's (130) lower beam is blocked by the buckle plates (227) but the frame (130) can keep going up until the spring tension is equal to the waves' thrusting force. Then the spring tension produce downward force to make the frame (130) go down smoothly; Similarly, the spring tension produce upward force to make the frame (130) go up smoothly when the big wave bring the frame (130) going down and its upper beam is blocked by the buckle plates (227).

As shown in FIG. 12A, on sideways rotation axis (223), the dynamic rotation gear (223) and the ratchet gear (224), each has to carry a shaft sleeve (223(a)) to run smoothly on sideways rotation axis (223) which does not spin by itself. On direction-reverse shaft (22b), the direction-reverse gear (22a) and the ratchet gear (224) each has to carry a shaft sleeve (223(a)) to run smoothly on direction-reverse shaft (22b) which does not spin by itself.

Figure 12B:
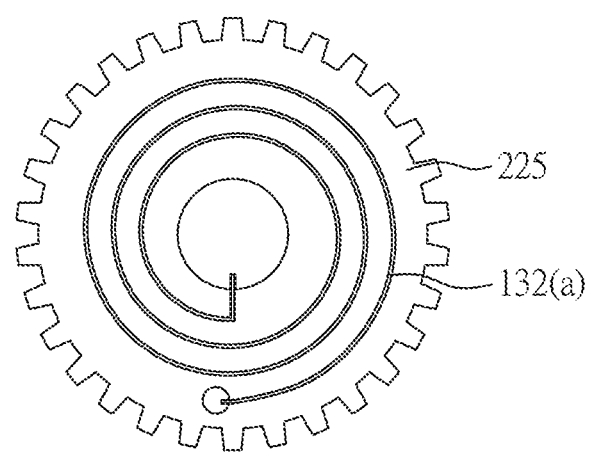
FIG. 12B is a schematic view of passive gear with spiral spring which is at loosening status.
Figure 12C:
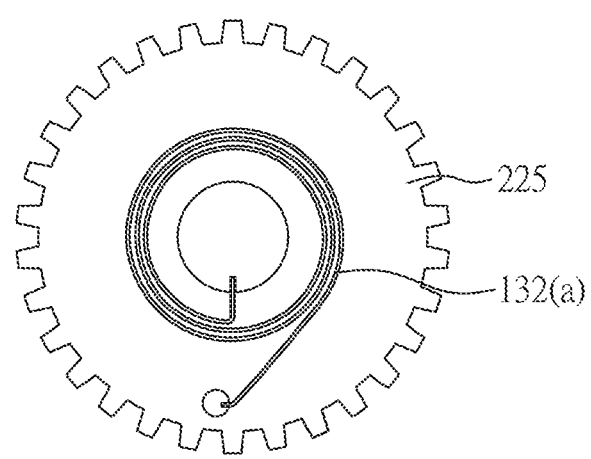
FIG. 12C is a schematic view of passive gear with spiral spring which is at tighten status.

As shown in FIGS. 12B and 12C, on passive gear (225), its lateral can be equipped with a coil spring (132(a)). When the passive gear (225) is not turning, the coil spring may be loosen. As the passive gear's (225) spinning speed is less than the spinning speed of the central rotation axis (221) the coil spring (132(a)) gradually tighten up to store the energy conveyed through pontoon; As the passive gear's (225) speed achieve that of the central rotation axis (221) this stored energy can be applied on the central rotation axis (221). Besides, other gears can be equipped with coil spring (132(a)) but there is no restriction on this issue.

Depending on the waves' undulation strength, the length of springs (132) and the length of gear racks (131) can be adjusted to monitor the activity scope of pontoons (10).

In an embodiment example, as shown in FIG. 3,5,7,8, on frame 130 lateral's four corners, four supporting rods (134) extend to above the floating platform's 20 supporting frame (220). On each end of these supporting rods (134), a link slide block (135) is attached (or embodied with bearing style). On the supporting frame (220), corresponding to the link slide block (135), a sliding rail (228) is set up. With this sliding rail's (228) constraint, the frame (130) can go up and down relative to the supporting frame (220). In another embodiment example, the bearing style means that at the center of the sliding rail (228) there is a rail (138). Two bearing pulleys attached at the end of the four support rods (134) can slide on the two sides of the rail (138).

As shown in FIG. 1,2,5,6, the profile of the partition plate unit (30) is shaped like a box without bottom and cover. This partition plate unit (30) encloses the floating platform unit (20) but only allows the outer rotation shaft' (222) connection bar (229) penetrate the partition plate unit (30) in order to contact the pontoon unit (10); Two terminals of this partition plate unit (30) are equipped with two floating boxes (360) to carry the weight of the partition plate unit (30). Under these floating boxes there may connect ropes (310). The other end of these ropes (310) then may be connected with heavy chunks (320) such as stone or iron chunks which are to be sunk to the seabed in order to hold the entire machinery not to be drift away. Each rope (310) can measure an equal distance from floating box' (360) connection point and then connect it to an iron ball (350). These four iron balls can equilibrate the entire machinery.

Figure 2A:
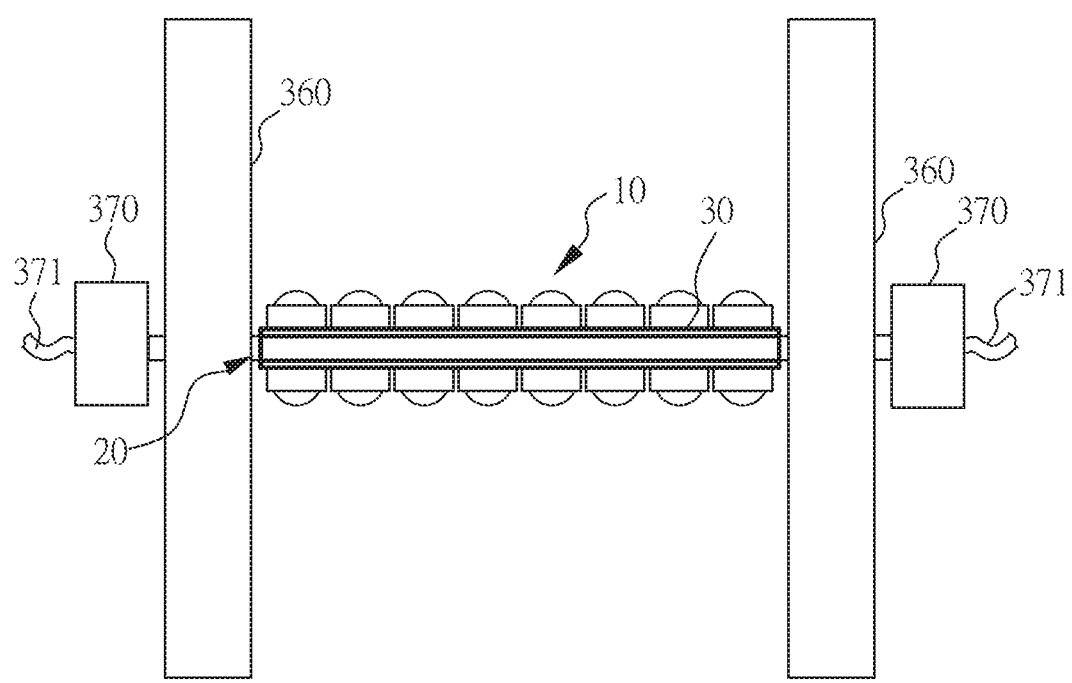
FIG. 2A is a schematic illustration of floating box' length and partition plate unit's length in an embodiment example.

The length of floating box (360) can be adjust according to the specific requirement. In an embodiment example, as shown on FIG. 2A, the length of the floating box (360) is close to the length of the partition plate unit (30). Hence if we connect the two endpoints of these two floating boxes (360) with dot lines, these four dot lines forms a square shape which further equilibrates the entire machinery. Besides, the two ends of wave electricity generator's central rotation shaft (221) may connect to external electric generator(s) (370) which may connect(s) to cables (371). Two or many external electric generators (370) may be connected with bus bar. If many wave powered electricity generators are connected together, the whole group may be even more equilibrated than an isolated one.

The partition plate unit (30) is to enclose the floating platform unit (20) from outside waves. This makes floating platform unit (20) stays in an almost waveless state while multiple pontoon units (10) stay among big waves. The bigger waves there are, the higher efficiency this wave powered electricity generator performs. As for other methods using gear rack to turn gear, because waves are not separated, two passive element, the gear rack and the gear, are bearing the waves' force in quite similar direction and dynamic, hence produce only low efficiency output.

Figure 7:
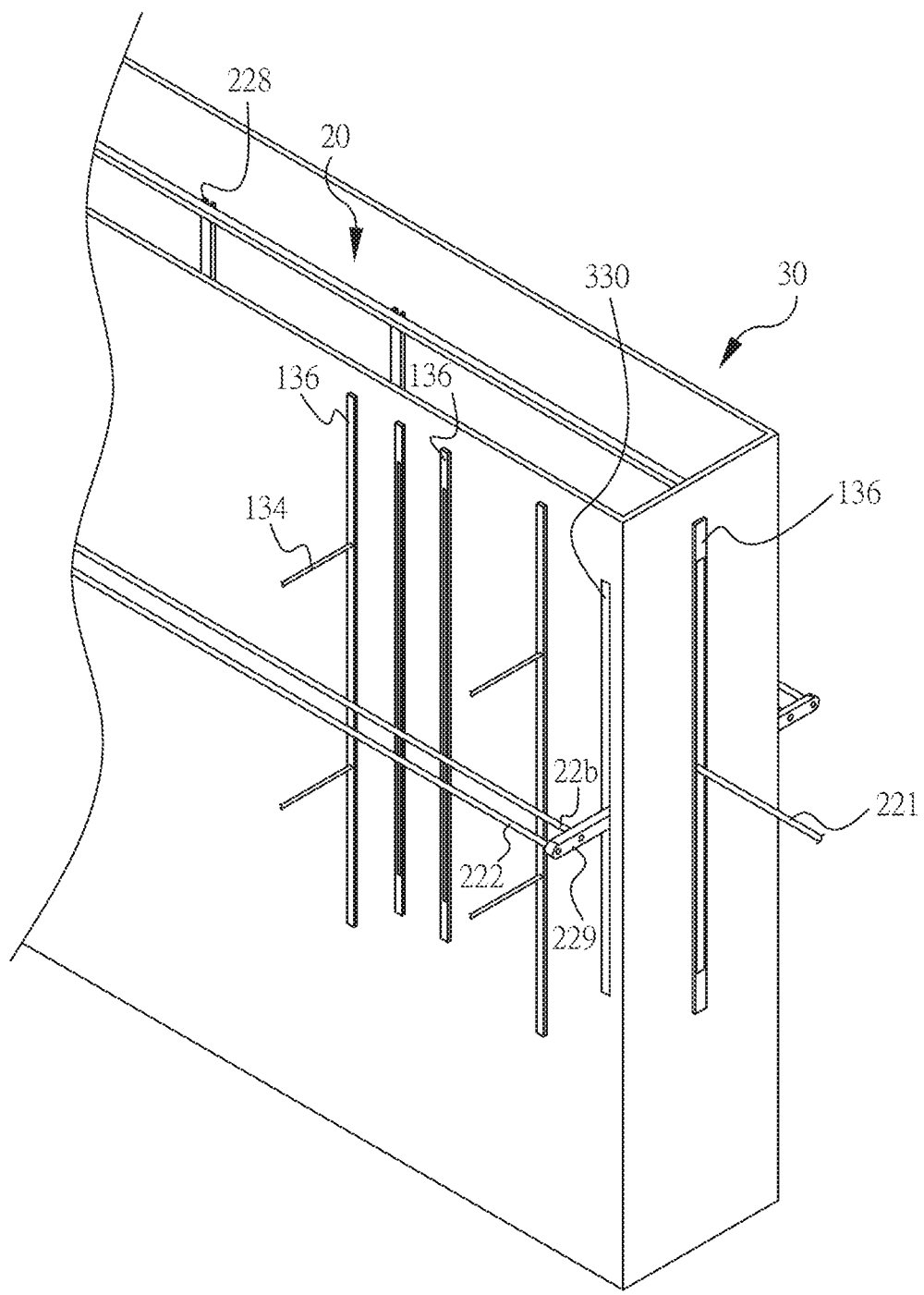
FIG. 7 is a partial schematic 3-D view of a combination of floating platform unit and partition plate unit in an embodiment example
Figure 8:
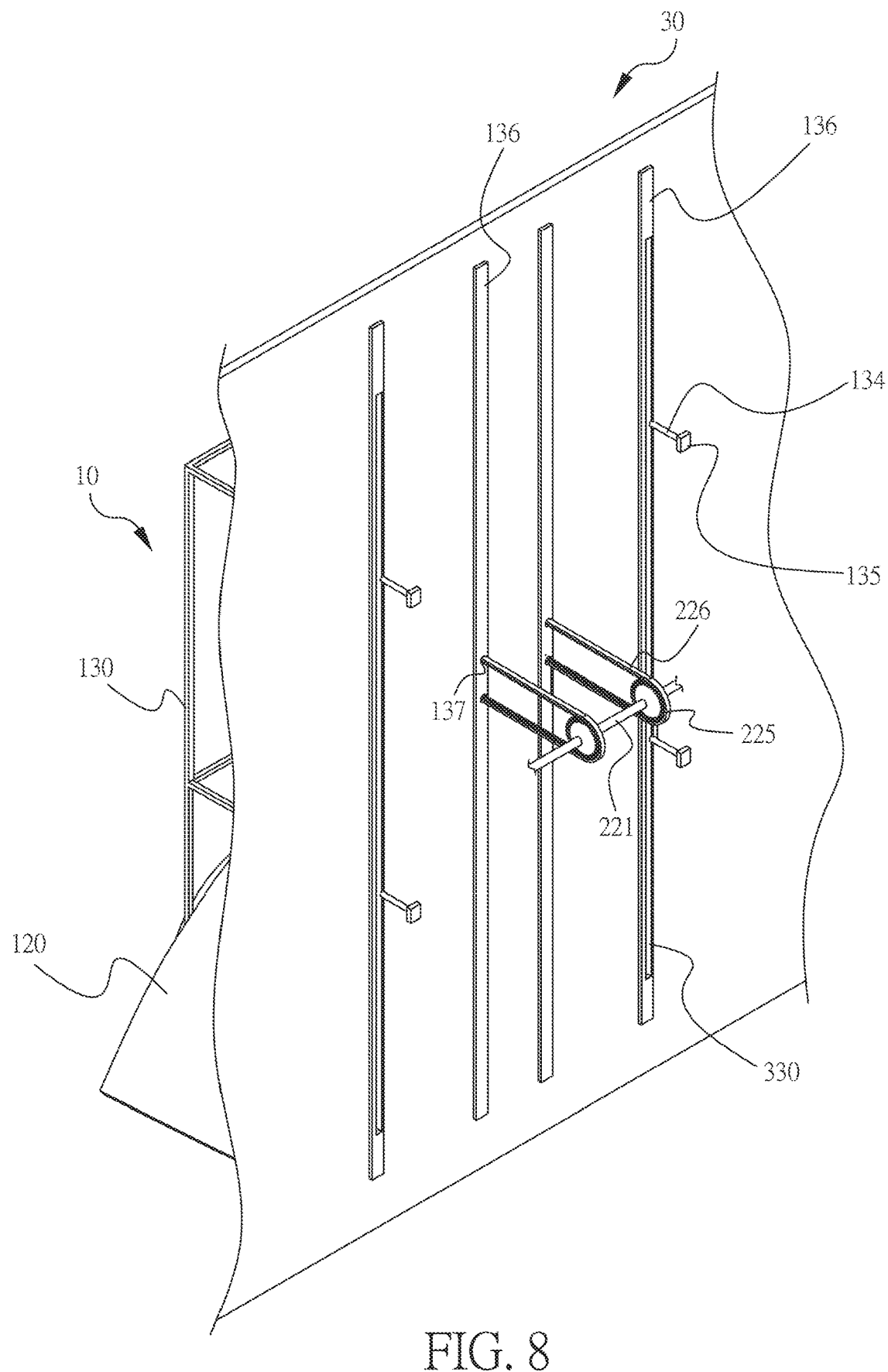
FIG. 8 is a schematic 3-D view of inner side of floating platform unit in inspecting the barrier strips covering the channels.
Figure 9:
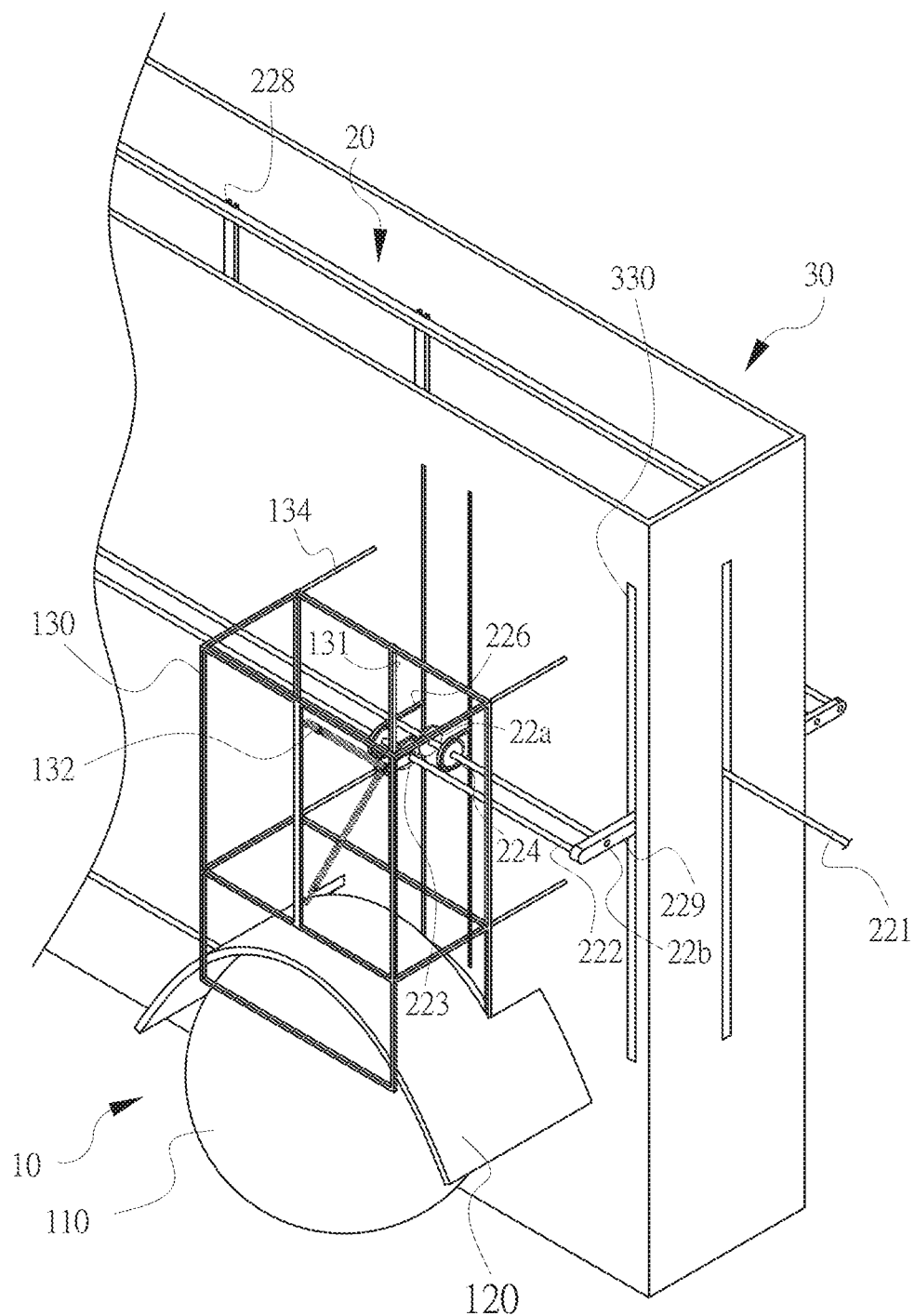
FIG. 9 is a partial schematic 3-D view of combination of pontoon unit, floating platform unit, and partition plate unit in an embodiment example
Figure 10:
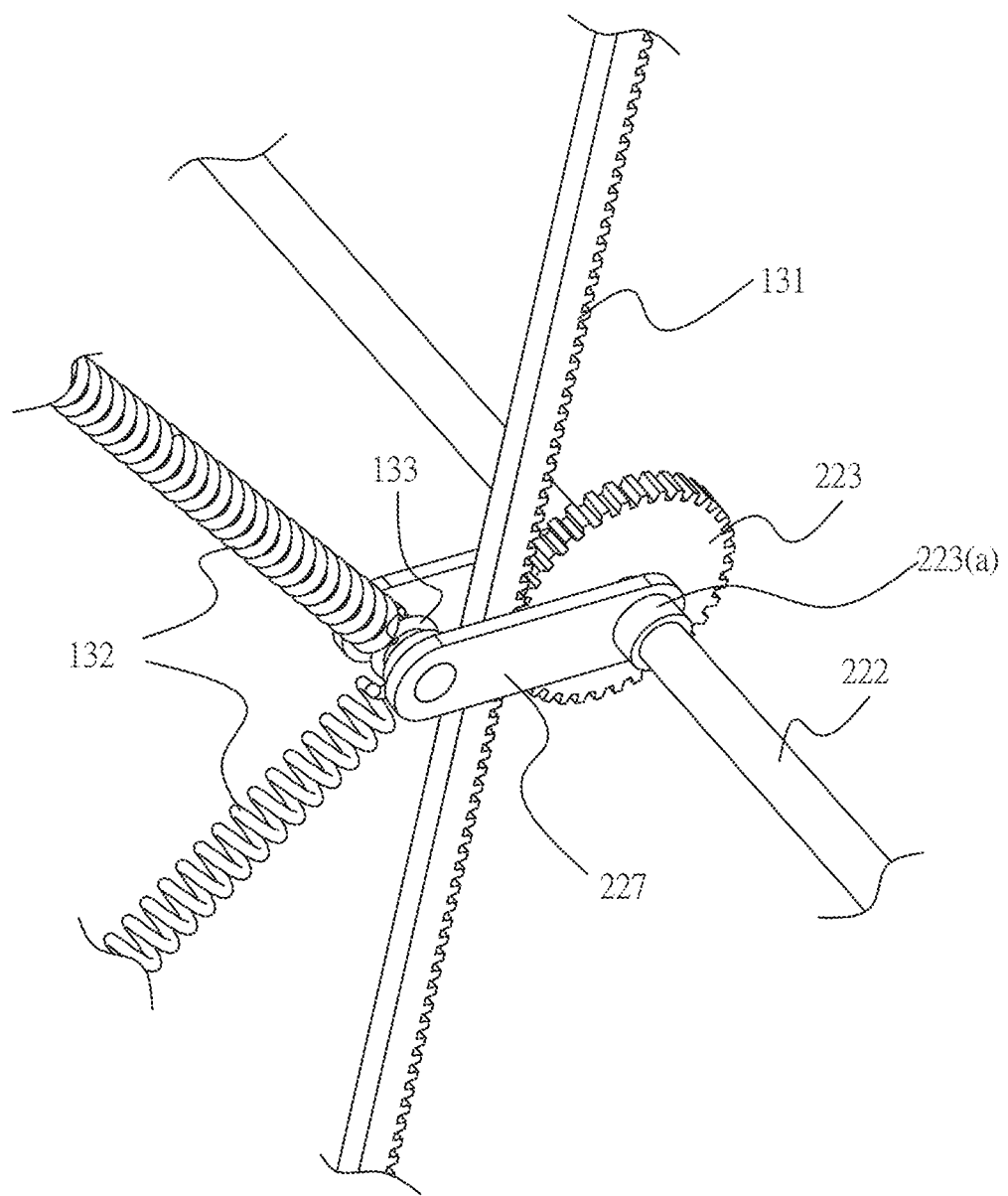
FIG. 10 illustrates how the spring and gear rack equipped on pontoon unit integrates the dynamic gear equipped on floating platform unit.
Figure 11:
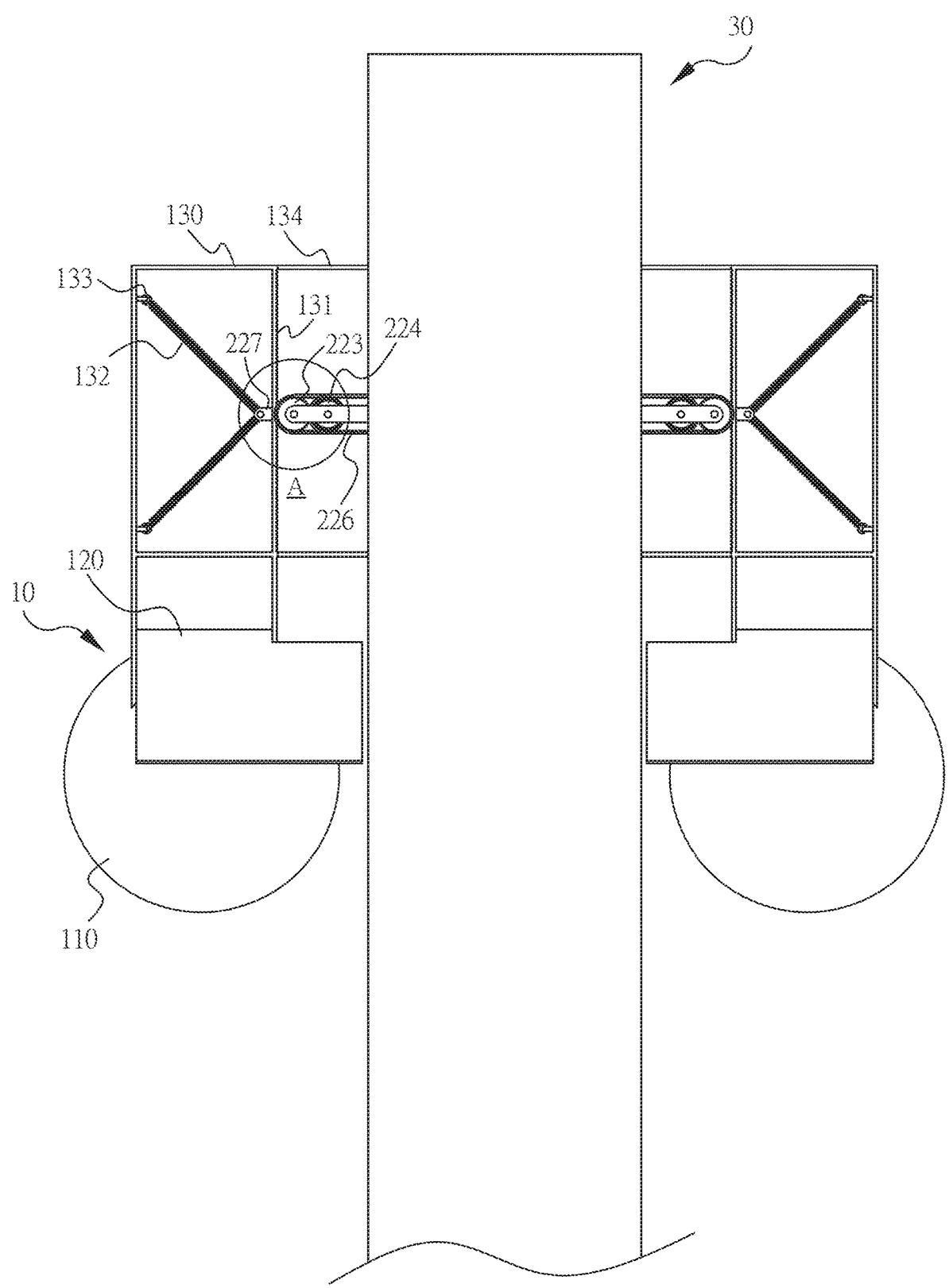
FIG. 11 is a schematic side view in an embodiment example
Figure 11A:
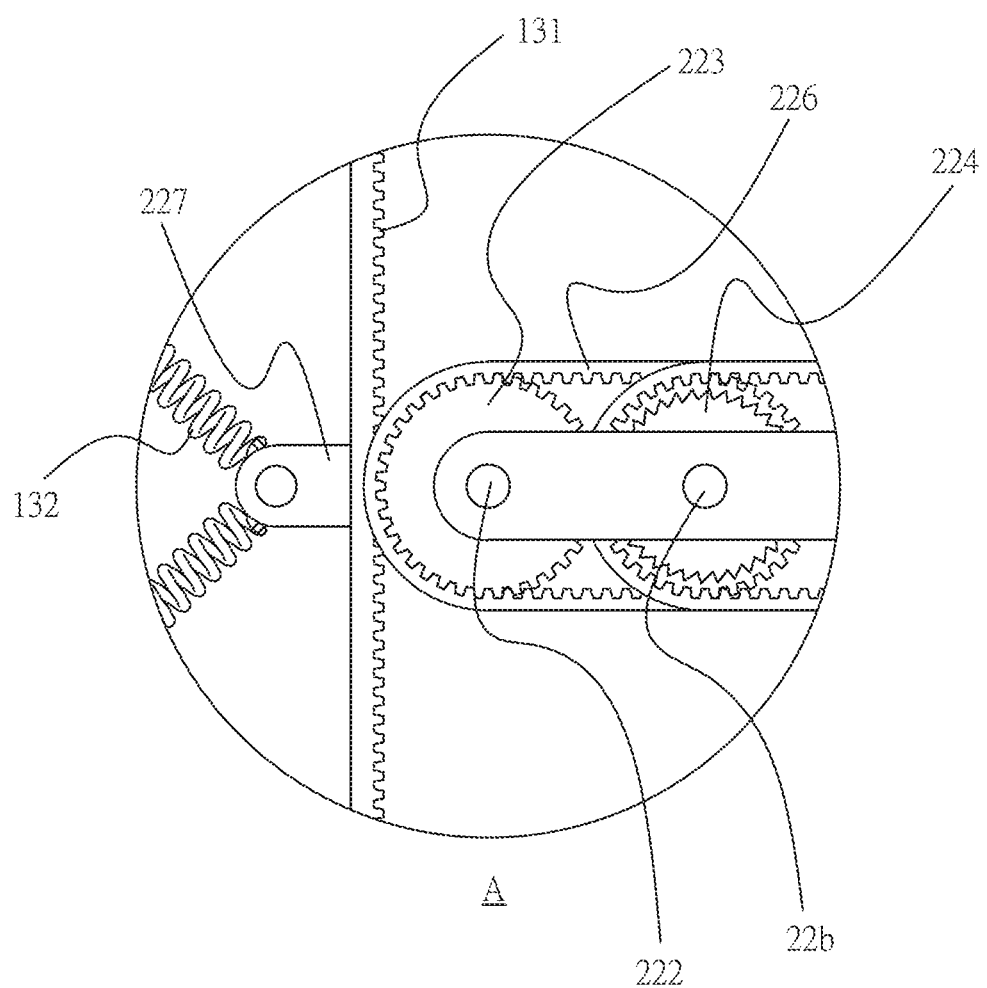
FIG. 11A is the magnified structural view of the spring, gear rack, and dynamic gear.

As shown on FIG. 7,8,9, the partition plate unit's (30) open channel (330) is to allow pontoon unit's (10) supporting rod (134) go up and down freely. But in order not to allow seawater seeps into the floating platform unit (20) through the partition plate unit's (30) open channel (330), the supporting rod (134) carries a barrier strip (136) inside the partition plate unit (30) and the barrier strip (136) is to press close to the partition plate unit (30). This barrier strip's (136) length is longer than the length of the open channel (330) for assuring that even the pontoon unit (10) moves in its maximum distance, the partition plate unit (30) still can block waves.

On partition plate unit (30), at the place where connection bar (229), cog belt or chain (226), and central rotation axis (221) penetrate through partition plate unit (30), open channels (330) are set up. Inside the partition plate unit (30) and pressing close to each of the open channels (330), a barrier strip (136) is set up on the supporting frame (220) of the floating platform unit (20). On each of the barrier strip (136), at where the connection bar (229), cog belt or chain (226), and central rotation axis (221) penetrate through, a hole (137) is set up. Thus when relative motion happens between pontoon unit (10) and partition plate unit (30), floating platform unit (20) and partition plate unit (30), each of the barrier strip (136) can cover each of the open channels (330). Each barrier strip (136) is made longer than each of the open channels (330) to ensure partition plate unit's (30) seawater-blocking function.

Besides, in order to avoid the collision between floating platform unit (20) and partition plate unit (30), at partition plate unit's (30) two end sides which are facing the floating platform unit's (20) end sides, also sliding rails (228) may be set up in order to allow the four link slide blocks (135) of the four supporting rods (134) which stretch out from the supporting frame of the floating platform unit to slide up and down freely inside the sliding rails (228). (No figure is provided.)

Figure 16A:
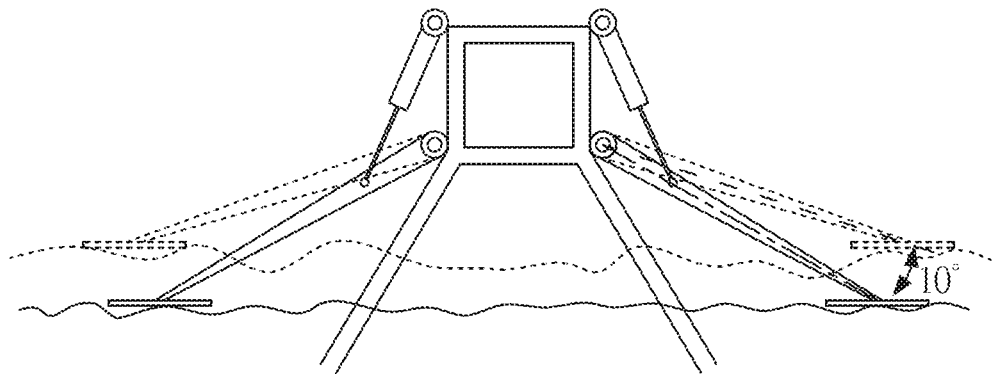
FIG. 16A illustrates the operation of an existing technic, crank-connecting mechanism.
Figure 16B:
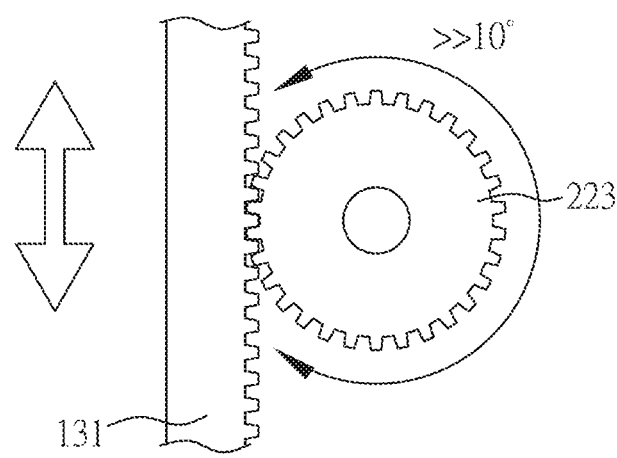
FIG. 16B illustrates the operation of this invention.

FIG. 16A illustrates the operation of an existing technic, crank-connecting mechanism, one of the point absorbing styles: Cranks are extended from the body's two sides to sea surface. At cranks' base ends there are equipped with floating plates which go up and down as the waves rise and fall thus it makes the cranks swing to rotate the central axes to generate electricity. Tremendous engineering works has to be done on this mechanism due to its huge structure and the hard work for fastening the body in seabed. The crank's swing angle is less than 10° thus the output efficiency is low. Referring to FIG. 16B, in this invention and by contrast, dynamic gears' 223 spin continually as the gear racks 131 go up and down during the waves rise and fall and the resulted spinning angle is way higher than 10°, hence it produce way higher efficiency than that of crank-connecting mechanism.

The electricity generated by electric generator set (370) can be conveyed or deposited by the following methods: hydrogen energy transferring, electrified wire netting, supercapacitors, battery, submarine cable, etc.

Above is one of the embodiment examples and not to be used to confine the scope of this invention's application. Besides, a simple model for testing was made and by using this model, a film which successfully demonstrates the fundamental essence of this invention is available.

The invention claimed is:

1. A wave powered electricity generator, comprising:
    a floating platform unit comprising a floating platform and a supporting frame, wherein the supporting frame is disposed on the floating platform;
    a central rotation shaft disposed on the supporting frame;
    at least one sideways rotation shaft located on at least one side of the central rotation shaft;
    at least one first gear disposed on the sideways rotation shaft, wherein the first gear is used to drive a second gear disposed on the central rotation shaft;
    at least one pontoon unit connected to the floating platform unit, wherein the pontoon unit is located on a side of the floating platform unit which is adjacent to the sideways rotation shaft, wherein the pontoon unit comprises a pontoon;
    an arched plate disposed on a top of the pontoon unit;
    a frame disposed on the arched plate;
    a vertical gear rack disposed on a side of the frame facing towards the floating platform unit, wherein the vertical gear rack is used to mesh the first gear;
    a partition plate unit enclosing at least a part of the floating platform unit;
    wherein at least one end of the central rotation shaft is connected to an electric generator;
    wherein the wave powered electricity generator further comprises a plurality of floating boxes or pontoons disposed on a bottom and/or two ends of the partition plate unit for supporting the partition plate unit to float on sea, and the floating platform unit comprises a connection bar, and the sideways rotation shaft is disposed on a connection bar, and the connection bar penetrates the partition plate unit and is connected with the pontoon unit via the sideways rotation shaft.

2. The wave powered electricity generator as stated in claim 1, further comprising:
    two buckle plates disposed on the sideways rotation shaft, wherein each of the buckle plates is located at each of two sides of the first gear;
    an upper spring and a lower spring respectively connected to ends of the buckle plates facing towards the pontoon unit;
    one or multiple pontoon units disposed on either one side or both sides of the floating platform unit;
    a first ratchet gear disposed on the sideways rotation shaft and located on a side of the first gear, wherein the first gear meshes a direction-reverse gear, and the direction-reverse gear is disposed on a direction-reverse shaft, and the direction-reverse shaft is disposed on the supporting frame of the floating platform unit;
    a second ratchet gear disposed on the direction-reverse shaft, wherein the first ratchet gear and the second ratchet gear are located on different sides of the first gear;
    two second gears disposed on the central rotation shaft, wherein each of the second gears and each of the ratchet gears are connected with a cog belt or a chain.

3. The wave powered electricity generator as stated in claim 2, wherein an end of the upper spring which is adjacent to the floating platform unit and an end of the lower spring which is adjacent to the floating platform unit are connected with the buckle plate via a buckle.

4. The wave powered electricity generator as stated in claim 2, wherein
    the length of the upper spring and the lower spring and the height of the gear rack can be adjusted to accommodate undulation strength of waves.

5. The wave powered electricity generator as stated in claim 2, further comprising:
    a plurality of open channels disposed on the partition plate unit, wherein each of the open channels is equipped at each place where the connection bar, the cog belt or the chain, and the central rotation shaft penetrate;
    a plurality of barrier strips disposed on the supporting frame of the floating platform unit, wherein each of the barrier strips is located inside the partition plate unit and presses close to each of the open channels, wherein the length of each of the barrier strips is larger than the length of each of the open channels;
    wherein, each of a plurality of holes is disposed on each of the barrier strips, and each of the holes is located at each place of where the connection bars, cog belt or chain, and central rotation axis penetrate through.

6. The wave powered electricity generator as stated in claim 1, further comprising:
    at least one supporting rod is disposed on a side of the frame facing towards the floating platform unit, wherein the supporting rod extends to the supporting frame, and an end of the supporting rod is connected with a link slide block and a barrier strip;
    a sliding rail disposed on the supporting frame, wherein a position of the sliding rail is corresponding to a track of the link slide block in order to limit activity of the link slide block inside the sliding rail.

7. The wave powered electricity generator as stated in claim 1, wherein
    an open channel is disposed on the partition plate unit and is corresponding to a track of the link slide block, and the supporting rod penetrates the open channel and combines with a barrier strip disposed inside of the partition plate unit, wherein the length of the barrier strip is longer than the length of the open channel.

8. The wave powered electricity generator as stated in claim 1, wherein
    a plurality of ropes are connected to the corners of the floating boxes or pontoons which are extended from the two ends of the floating platform unit, and ends of the ropes are connected with heavy chunks which are to be sunk to the seabed in order to hold the entire wave powered electricity generator not to be drift away, wherein each rope is used to measure an equal distance from floating box' connection point and then connect it to an iron ball, and the iron balls are for equilibrating the wave powered electricity generator.

* * * * *